(12) United States Patent
Kim et al.

(10) Patent No.: US 9,961,530 B2
(45) Date of Patent: May 1, 2018

(54) METHOD FOR OBTAINING TRAFFIC INFORMATION USING LOCAL AREA COMMUNICATION, AND APPARATUS THEREFOR

(71) Applicant: LG ELECTRONICS INC., Seoul (KR)

(72) Inventors: Hakseong Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/909,688

(22) PCT Filed: Aug. 4, 2014

(86) PCT No.: PCT/KR2014/007178
§ 371 (c)(1),
(2) Date: Feb. 2, 2016

(87) PCT Pub. No.: WO2015/016689
PCT Pub. Date: Feb. 5, 2015

(65) Prior Publication Data
US 2016/0192172 A1    Jun. 30, 2016

Related U.S. Application Data

(60) Provisional application No. 61/861,434, filed on Aug. 2, 2013.

(51) Int. Cl.
*H04W 4/00* (2018.01)
*H04W 8/00* (2009.01)
(Continued)

(52) U.S. Cl.
CPC ........ *H04W 8/005* (2013.01); *G01C 21/3694* (2013.01); *G08G 1/096791* (2013.01); *H04L 67/12* (2013.01); *H04W 4/046* (2013.01)

(58) Field of Classification Search
CPC ...... H04W 8/005; H04W 4/046; H04L 67/12; G01C 21/3694; G08G 1/096791
(Continued)

(56) References Cited

U.S. PATENT DOCUMENTS

2004/0073361 A1* 4/2004 Tzamaloukas ..... G01C 21/3691
701/414
2007/0115895 A1* 5/2007 Ling ..................... G01S 5/0289
370/338
(Continued)

FOREIGN PATENT DOCUMENTS

KR    10-2005-0122579    12/2005
KR    1020080051304      6/2008
(Continued)

OTHER PUBLICATIONS

PCT International Application No. PCT/KR2014/007178, Written Opinion of the International Searching Authority dated Nov. 20, 2014, 22 pages.
(Continued)

*Primary Examiner* — Peter Cheng
(74) *Attorney, Agent, or Firm* — Lee Hong Degerman Kang & Waimey

(57) ABSTRACT

The present invention relates to a wireless communication system. More particularly, the present invention relates to a method and an apparatus for obtaining traffic information by a terminal in a wireless communication system. The method comprises the steps of: broadcasting a first D2D discovery signal requesting traffic information to a plurality of first surrounding terminals; receiving, in response to the first D2D discovery signal, a second D2D discovery signal indicating surrounding traffic information from one or more second surrounding terminals among the plurality of first surrounding terminals; and updating the traffic information
(Continued)

of the surrounding area on the basis of the one or more second D2D discovery signals.

6 Claims, 11 Drawing Sheets

(51) Int. Cl.
*G08G 1/0967* (2006.01)
*H04W 4/04* (2009.01)
*G01C 21/36* (2006.01)
*H04L 29/08* (2006.01)

(58) Field of Classification Search
USPC .......................................................... 370/329
See application file for complete search history.

(56) References Cited

U.S. PATENT DOCUMENTS

| | | | |
|---|---|---|---|
| 2009/0017855 A1* | 1/2009 | Kwon | H04W 76/023 455/509 |
| 2009/0082950 A1 | 3/2009 | Vorona | |
| 2011/0071756 A1 | 3/2011 | Stahlin | |
| 2011/0080869 A1* | 4/2011 | Walton | H04L 45/306 370/328 |
| 2012/0265818 A1 | 10/2012 | Van Phan et al. | |
| 2013/0099941 A1 | 4/2013 | Jana et al. | |
| 2014/0215039 A1* | 7/2014 | Ali | H04L 67/327 709/223 |

FOREIGN PATENT DOCUMENTS

| | | |
|---|---|---|
| KR | 1020100107800 | 10/2010 |
| WO | 2013/012222 | 1/2013 |

OTHER PUBLICATIONS

European Patent Office Application Serial No. 14832636.6, Search Report dated Jan. 2, 2017, 7 pages.
State Intellectual Property Office of the People's Republic of China Application Serial. No. 2011480043816.0, Office Action dated Oct. 31, 2016, 21 pages.

* cited by examiner

METHOD FOR OBTAINING TRAFFIC INFORMATION USING LOCAL AREA COMMUNICATION, AND APPARATUS THEREFOR

CROSS-REFERENCE TO RELATED APPLICATIONS

This application is the National Stage filing under 35 U.S.C. 371 of International Application No. PCT/KR2014/007178, filed on Aug. 4, 2014, which claims the benefit of U.S. Provisional Application No. 61/861,434, filed on Aug. 2, 2013, the contents of which are all hereby incorporated by reference herein in their entirety.

TECHNICAL FIELD

The present invention relates to a method for obtaining/providing traffic information in a wireless communication system and an apparatus therefor. More particularly, the present invention relates to a method for obtaining/providing traffic information using device-to-device communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE

Technical Problem

An object of the present invention is to provide a method for efficiently obtaining/providing traffic information in a wireless communication system. Specifically, an object of the present invention to provide a method for obtaining/providing traffic information using device-to-device communication and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to one aspect of the present invention, a method for acquiring traffic information by a UE in a wireless communication system includes: broadcasting a first device-to-device (D2D) discovery signal requesting traffic information to a plurality of first neighboring UEs; receiving, in response to the first D2D discovery signal, one or more second D2D discovery signals indicating traffic information from one or more second neighboring UEs from among the plurality of first neighboring UEs; and updating traffic information of a surrounding area on the basis of the one or more second D2D discovery signals.

The method may further include receiving additional traffic information about the one or more second neighboring UEs from an eNB, wherein the traffic information of the surrounding area is updated on the basis of the traffic information and the additional traffic information.

The traffic information of the surrounding area may be updated on the basis of a distribution of positions of the one or more neighboring UEs transmitting the one or more second D2D discovery signals per response time.

The one or more neighboring UEs may correspond to UEs satisfying predetermined traffic conditions from among the plurality of first neighboring UEs, wherein the traffic information of the surrounding area is updated using the predetermined traffic conditions and position information of the one or more second neighboring UEs.

The method may further include overlaying the updated traffic information of the surrounding area on a display of a vehicle navigation system displaying traffic maps.

According to another aspect of the present invention, a UE used in a wireless communication system includes: a radio frequency (RF) unit; and a processor, wherein the processor is configured to broadcast a first D2D discovery signal requesting traffic information to a plurality of first neighboring UEs, to receive, in response to the first D2D discovery signal, one or more second D2D discovery signals indicating traffic information from one or more second neighboring UEs from among the plurality of first neighboring UEs and to update traffic information of a surrounding area on the basis of the one or more second D2D discovery signals.

The processor may be configured to receive additional traffic information about the one or more second neighboring UEs from an eNB, wherein the traffic information of the surrounding area is updated on the basis of the traffic information and the additional traffic information.

The traffic information of the surrounding area may be updated on the basis of a distribution of positions of the one or more neighboring UEs transmitting the one or more second D2D discovery signals per response time.

The one or more neighboring UEs may correspond to UEs satisfying predetermined traffic conditions from among the plurality of first neighboring UEs, wherein the traffic information of the surrounding area is updated using the predetermined traffic conditions and position information of the one or more second neighboring UEs.

The processor may be configured to overlay the updated traffic information of the surrounding area on a display of a vehicle navigation system displaying traffic maps.

Advantageous Effects

According to embodiments of the present invention, it is possible to efficiently obtain/provide traffic information in a wireless communication system. Specifically, it is possible to provide an efficient method for obtaining/providing traffic information using device-to-device communication.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). 3$^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
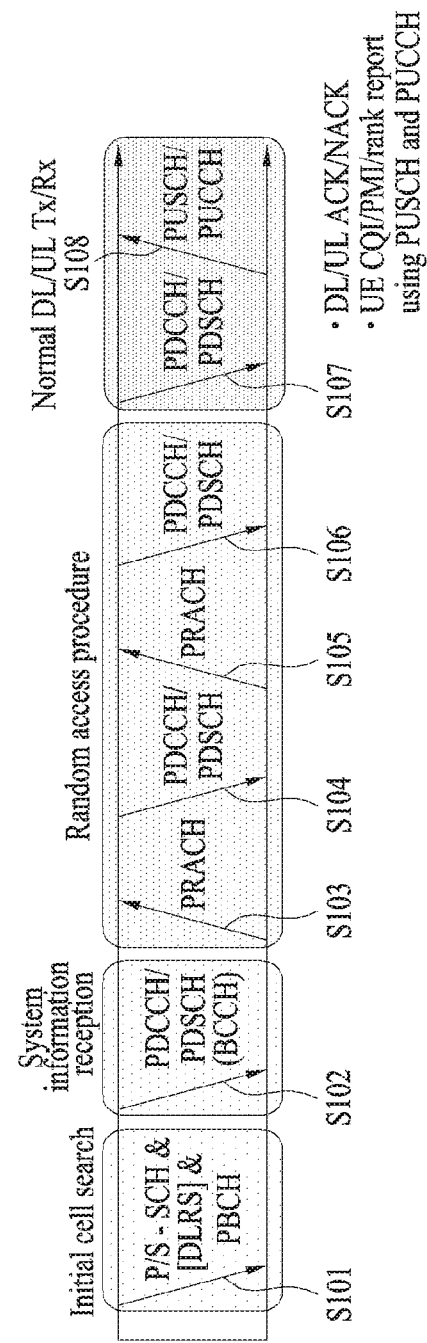
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
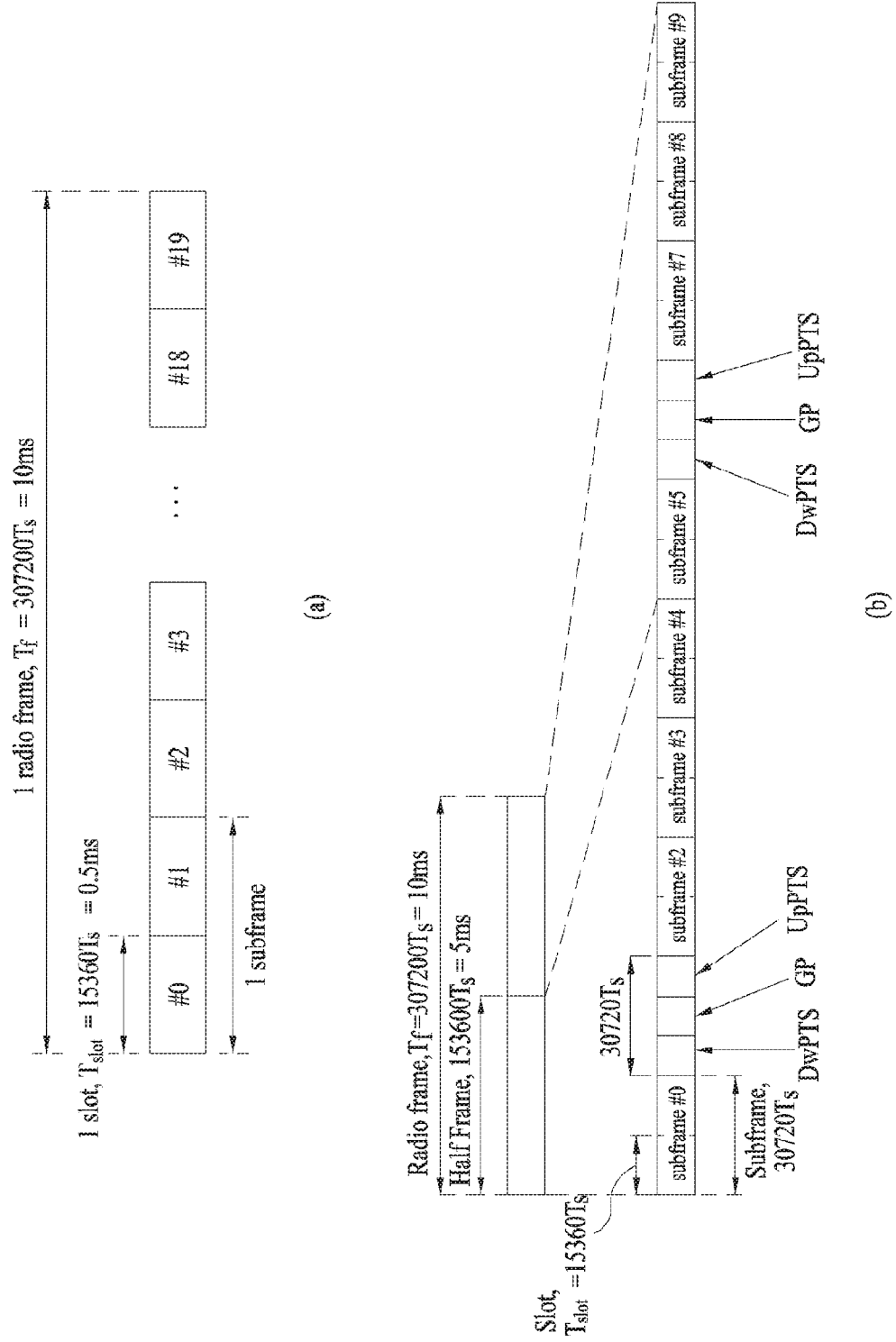
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL)SC-FDMA symbols in the time domain.

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

Figure 3:
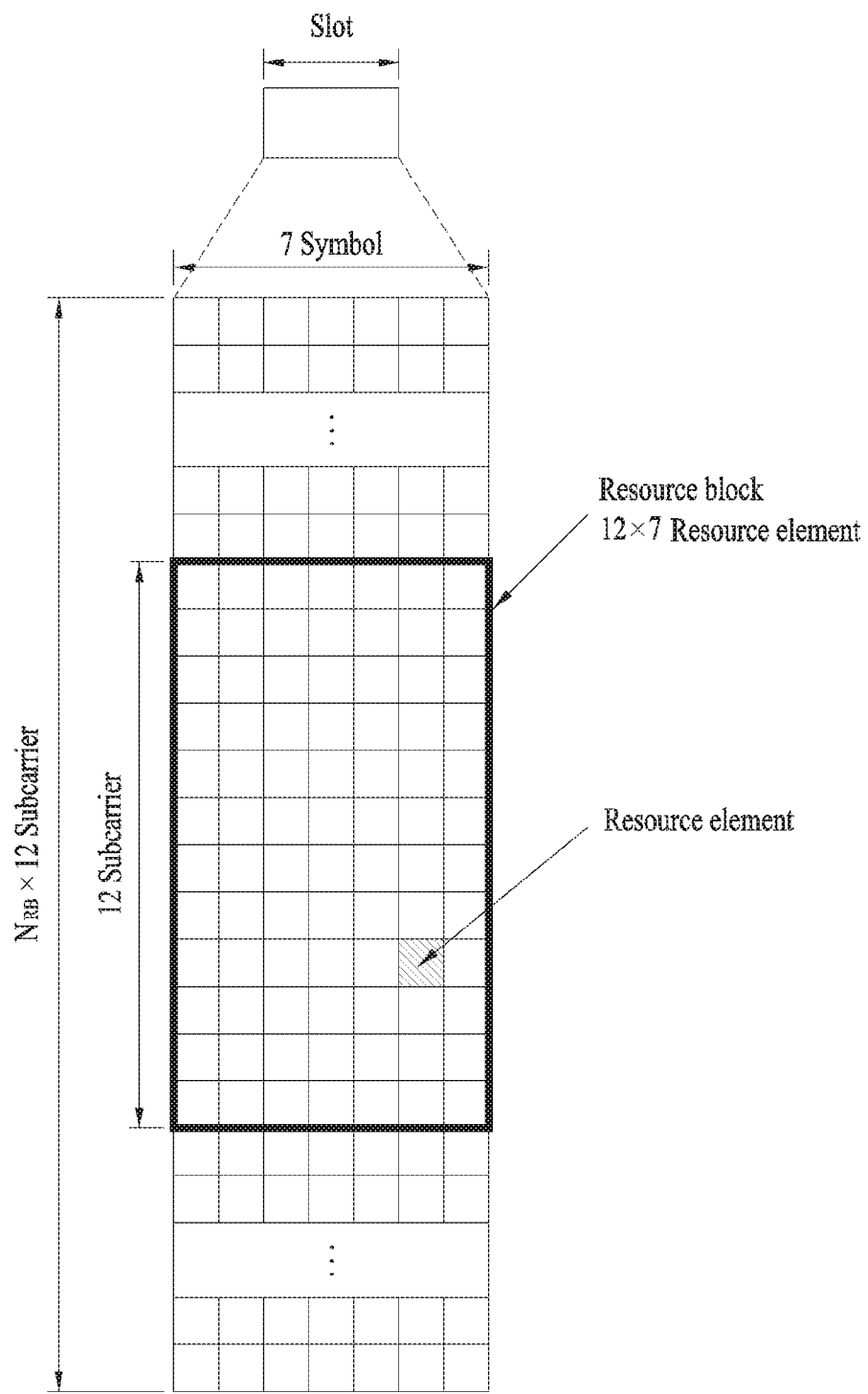
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
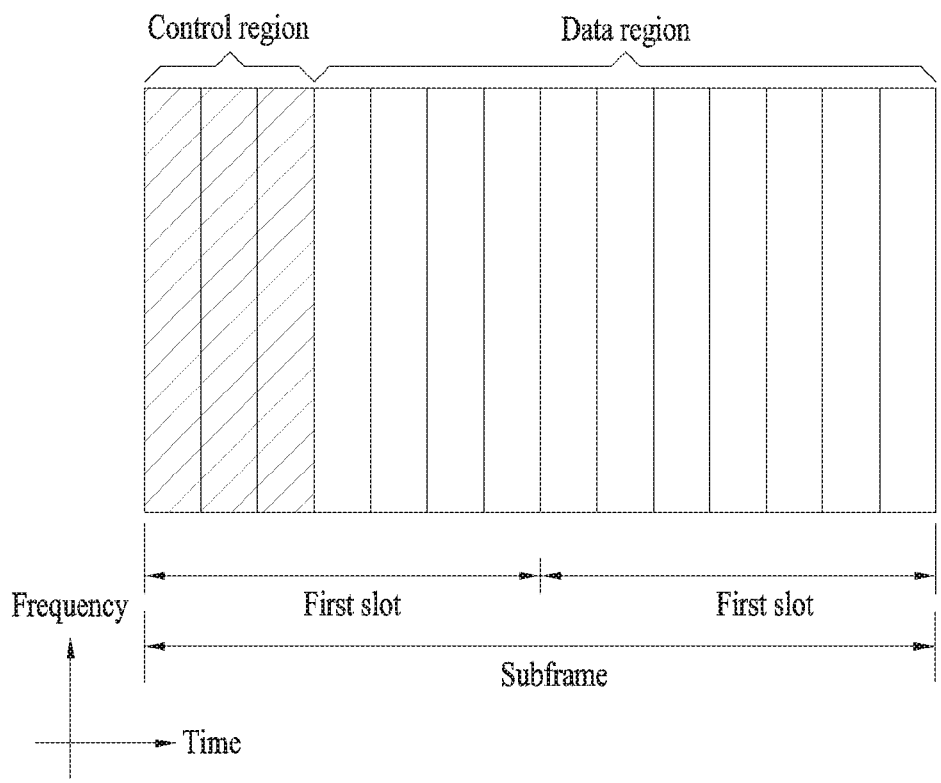
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a cyclic redundancy check (CRC) for error detection to the control information. The CRC is masked with an identifier (e.g. a radio network temporary identifier (RNTI) according to the owner or usage of a PDCCH. In other words, the PDCCH is CRC-scrambled with an identifier (e.g. RNTI). For example, when the PDCCH is destined for a specific UE, the CRC can be masked with a UE identifier (e.g. cell-RNTI or C-RNTI). When the PDCCH is for a paging message, the CRC can be masked with a paging identifier (e.g. paging-RNTI or P-RNTI). When the PDCCH is for system information (e.g. a system information block (SIB)), the CRC can be masked with a system information RNTI (SI-RNTI). When the PDCCH is for random access response, the CRC can be masked with a random access RNTI (RA-RNTI).

Figure 5:
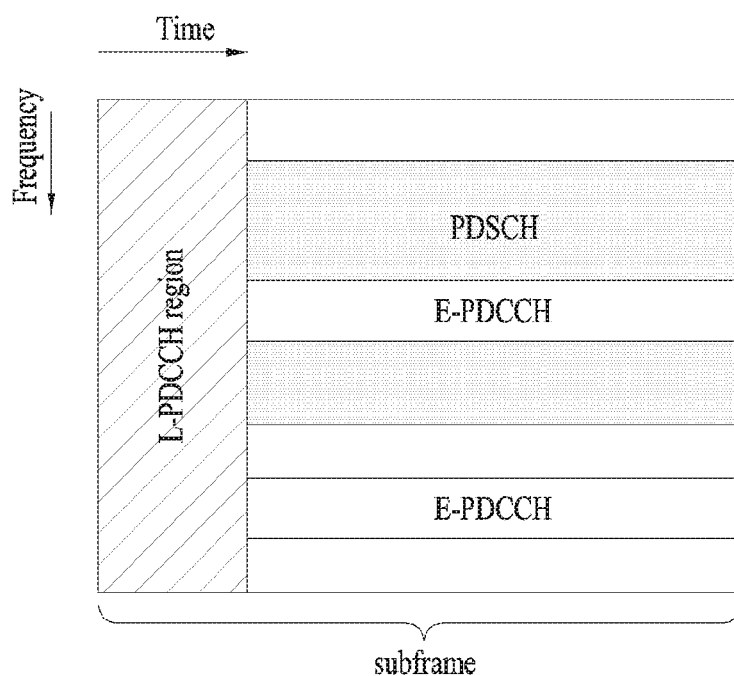
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
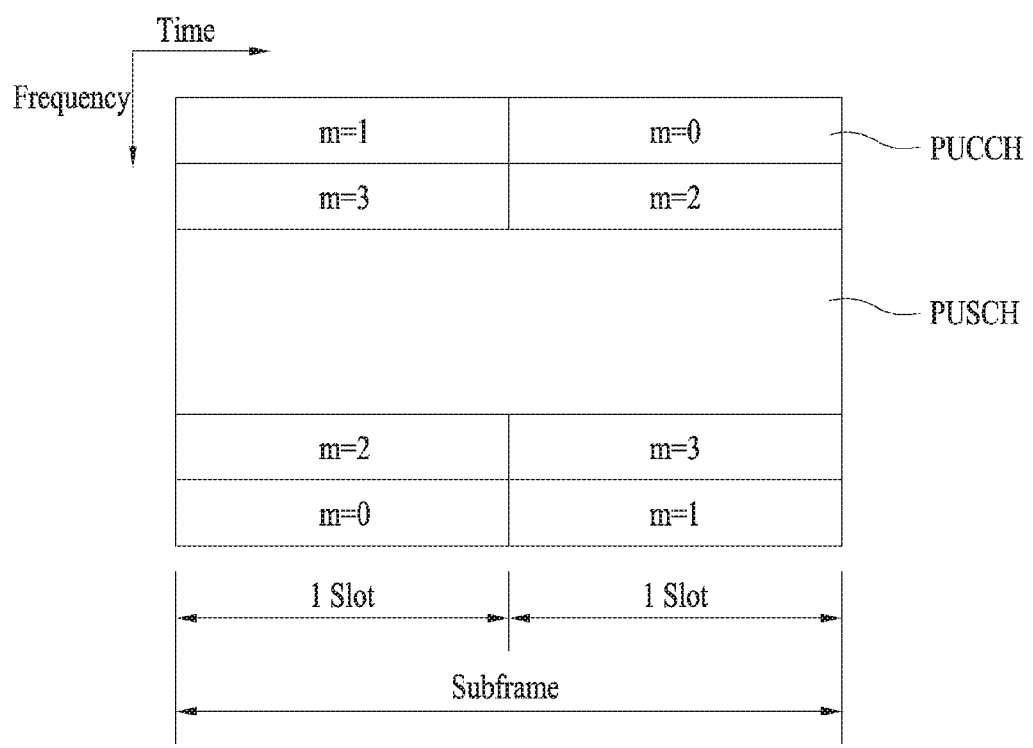
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.
Channel Quality Indicator (CSI): feedback information for a DL channel. MIMO-related feedback information includes an RI and a PMI. The CQI occupies 20 bits per subframe.

Figure 7:
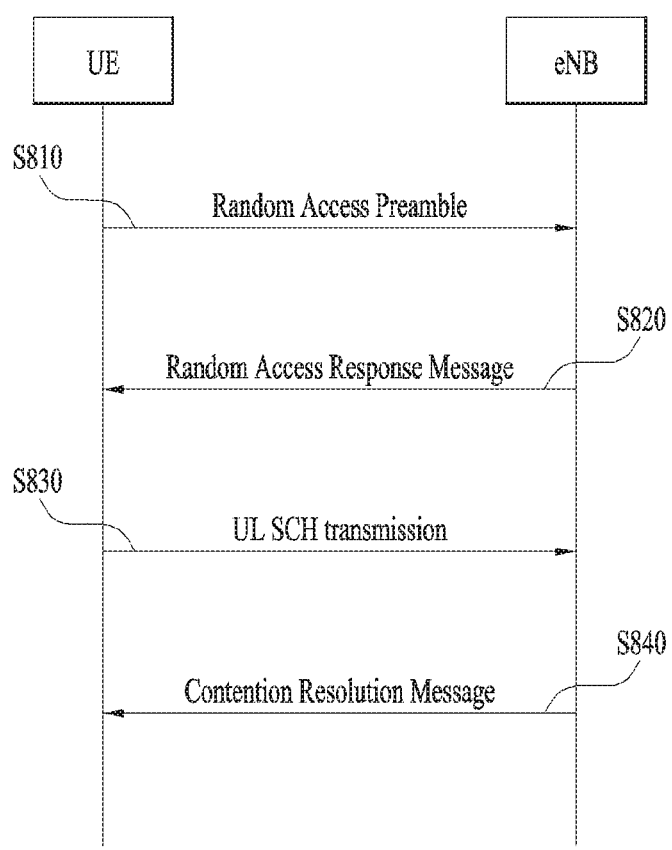
FIG. 7 illustrates a random access procedure.

FIG. 7 illustrates a random access procedure. The random access procedure is used to transmit short data. For example, the random access procedure is performed in cases of initial access in radio resource control (RRC)_IDLE, initial access after radio link failure, handover requiring the random access procedure and uplink/downlink data generation requiring the random access procedure during RRC_CONNECTED. The random access procedure is divided into a contention based procedure and a non-contention based procedure.

Referring to FIG. 7, a UE receives information about random access from an eNB through system information and stores the received information. The UE transmits a random access preamble (message 1 (Msg1)) to the eNB through a PRACH when random access is necessary (S810). Upon reception of the random access preamble from the UE, the eNB sends a random access response message (message 2 (Msg2)) to the UE (S820). Specifically, downlink scheduling information about the random access response message is CRC-masked with an RA-RNTI and transmitted through a PDCCH. Upon reception of the downlink signaling information masked with the RA-RNTI, the UE can receive the random access response message through a PDSCH. Then, the UE checks whether the random access response message includes a random access response (RAR) destined for the UE. The RAR includes a timing advance (TA), uplink resource allocation information (UL grant) and a temporary UE identifier. The UE sends a UL shared channel (UL-SCH) message (message 3 (Msg3)) to the eNB according to the UL Grant (S830). The eNB transmits a contention resolution message (message 4 (Msg4)) to the UE upon reception of the UL-SCH message (S840).

The aforementioned conventional LTE communication scheme considers a communication method between an eNB and a UE. Recently, demand for development of device-to-device (D2D) communication has increased. D2D can execute various functions including a function of exchanging a simple signal (e.g. a discovery signal) and a function of transmitting/receiving large-capacity files (e.g. direct communication) and provide various services using the functions. For example, it is possible to implement a group communication service by which multiple users simultaneously perform communication on the basis of a function of transmitting a signal or data from a single UE to a plurality of specific or unspecific UEs. In addition, a UE functioning as a UE-based relay, that is, a UE relay may be used for D2D. For example, when D2D cannot be performed, a UE capable of functioning as a relay from among a plurality of candidate UEs can perform communication relay. Furthermore, functions and services of D2D can be extended to peer-to-peer communication and many-to-many (M2M) communication, and distributed communication according to a mesh network structure can be performed.

Figure 8:
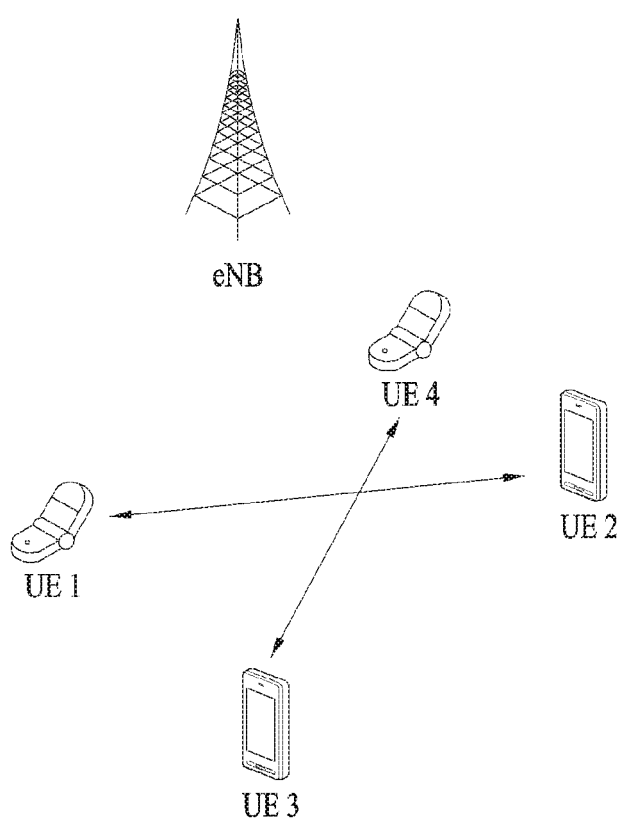
FIG. 8 illustrates device-to-device (D2D) communication.

FIG. 8 illustrates D2D communication. D2D is technology by which UEs directly exchange messages without passing through a network (e.g. eNB). Referring to FIG. 8, UE1 and UE2 directly communicate with each other and UE3 and UE4 directly communicate with each other. An eNB can control positions of time/frequency resources, transmit power and the like for direct communication between UEs through appropriate control signals. D2D may be referred to as direct communication between UEs or UE direct communication.

To initiate/link D2D communication, a UE needs to discover a neighboring UE. A process of discovering a neighboring UE is referred to as a discovery process. The discovery process may be performed as follows.

(i) A UE (referred to as a discovery D2D UE hereinafter) can send a predefined radio signal (referred to as a discovery signal hereinafter) in order to discover a neighboring UE (referred to as discoveree D2D UE hereinafter) as necessary (e.g. when the UE intends to initiate D2D communication). The discovery signal may include identification information (e.g. UE ID) of the discovery D2D UE.

(ii) Upon reception of the discovery signal, the discoveree D2D UE can send a response signal to the discovery D2D UE. The response signal may be a discovery signal of the discoveree D2D UE. The response signal may include identification information (e.g. UE ID) of the discoveree D2D UE.

(iii) The discovery D2D UE and the discoveree D2D UE can negotiate/exchange UE capability in order to establish a direct communication path therebetween.

The discovery process can be performed with or without the aid of a network. When a D2D UE discovers a neighboring D2D UE with which the D2D UE wants to communicate, a D2D connection establishment process can be performed. Upon establishment of D2D connection, data can be exchanged through a direct communication path between the D2D UEs.

Embodiment: Acquisition/Provision of Traffic Information Using D2D

A conventional navigation system includes sensors or data collection devices installed at specific positions/intervals and provides information about vehicle speed and congestion on the basis of the number of vehicles passing per unit time and a time required for a vehicle to pass through a sensor section in real time. Here, a signal transmission device or a proximity sensor (e.g. radio frequency (RF) recognition device) needs to be attached to each vehicle such that the sensors or the system can recognize the vehicle or passing of the vehicle by a specific position. Such a device is attached to taxis rather than general vehicles. Accordingly, the conventional system was used to detect traffic conditions of main roads since the number of vehicle samples by which traffic information can be obtained is small. Particularly, in the case of alleys, vehicles having the aforementioned devices attached thereto rarely pass, and thus the value of traffic information about the area corresponding to the alleys is very low.

Figure 9:
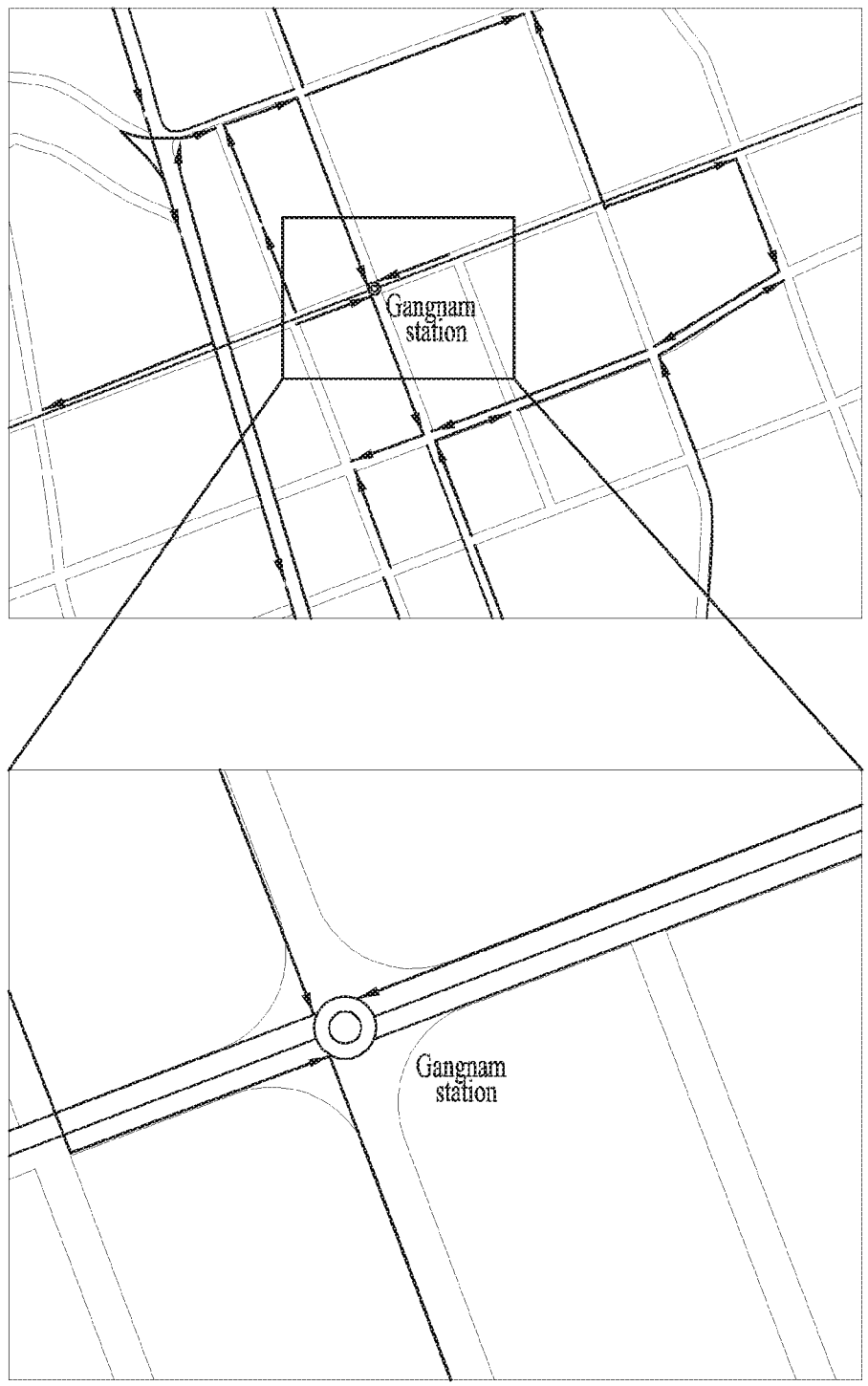
FIG. 9 illustrates a traffic information map.

FIG. 9 shows a conventional map indicating traffic information about an area surrounding Gangnam station. Referring to FIG. 9, traffic information (arrows) about only main roads and expressways is indicated and information about feeder roads and alleys cannot be acquired even if the map is magnified. This is because systems and infrastructure for collecting traffic information were not installed at the feeder roads or alleys. These systems centrally collect and analyze a vast amount of data and broadcast traffic information using cellular, DMB or a central broadcast system and thus essentially need infrastructures such as data collection and analysis, broadcasting, and related collection equipment. Therefore, the systems are provided for services rather than profit since enormous initial capital and maintenance costs are required, and huge construction costs are necessary to cover all alleys.

To solve this problem, the present invention provides a method for detecting surrounding traffic information on the basis of a method of sharing location information of UEs (e.g. vehicles) by the UEs in a distributed manner. Specifically, the present invention provides a method for collecting and sharing traffic information (based on a specific area) using D2D. Since D2D UEs can directly transmit/receive signals to/from each other and freely exchange information, the D2D UEs can exchange necessary information using this characteristic as necessary or periodically. In addition, a D2D UE can provide real-time traffic information about the surrounding area since the D2D UE can detect location information thereof. A single D2D UE may transmit all traffic information about an area of interest (e.g. alley) as necessary. For convenience, a D2D UE can be referred to as a UE in the following description. In the following, a UE includes a UE installed in a vehicle or a UE carried by a person who gets in a vehicle. The present invention can provide a system in which a specific user can detect traffic condition of a specific surrounding area at a specific position at a specific time in real time on the basis of their will or predetermined parameters.

Figure 10:
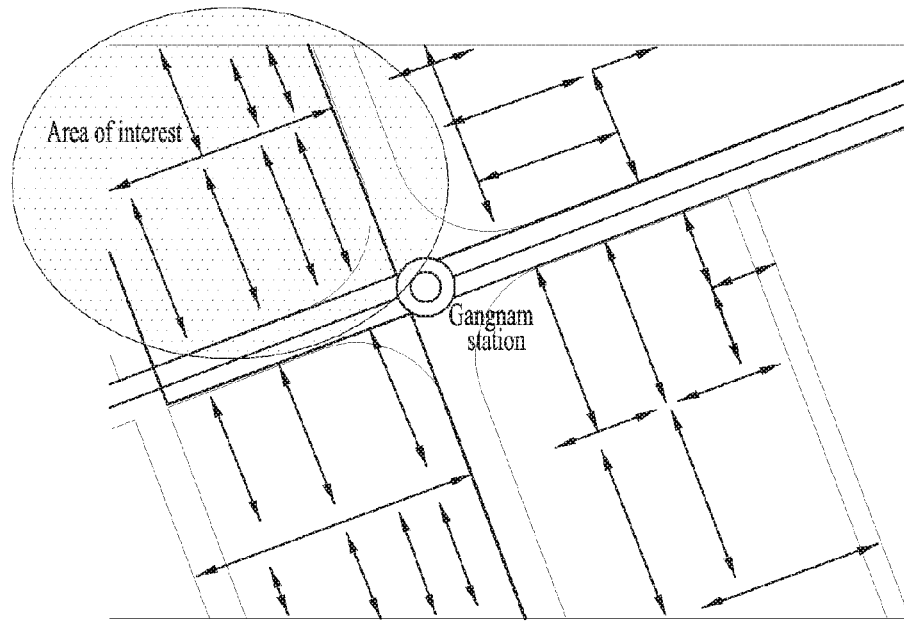
FIG. 10 illustrates a traffic information map according to the present invention.

FIG. 10 shows traffic information when the D2D based method according to the present invention is used. FIG. 10 illustrates a traffic information map of each D2D UE (vehicle), which is constructed by each D2D UE on the basis of traffic information received from a plurality of D2D UEs (vehicles) present in alleys. Since even if UEs receive the same information, the UEs may differently analyze and display the information, the UE may construct traffic information maps in different forms even when the UEs construct traffic information maps about the same area. Alternatively, a UE may construct a traffic information map of its own by selectively setting information of interest. For example, when the UE collects more information about alleys of interest and collects less information about alleys in which the UE has no interest on the assumption that the UE spends the same time and effort, and assigns different weights to the collected information as necessary, the UE can obtain more accurate information about the alleys of interest. Traffic information (map) about a surrounding area, updated according to the present invention, can be overlaid on a display of a vehicle navigation system which displays traffic maps.

Figure 11:
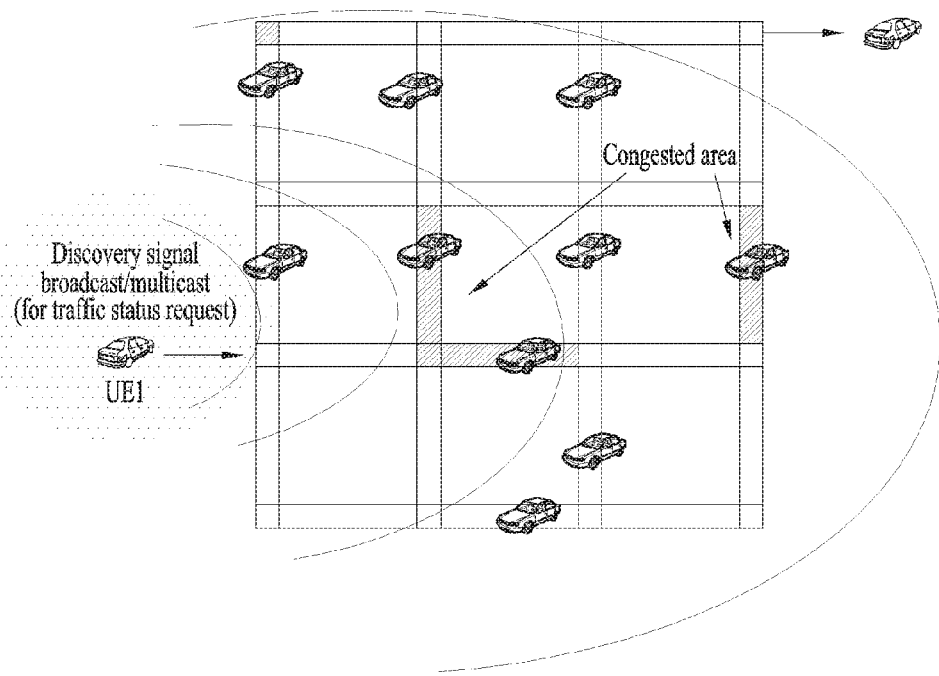
FIGS. 11, 12 and 13 illustrate a method for acquiring traffic information according to the present invention.

FIG. 11 illustrates a method for acquiring traffic information according to the present invention. Referring to FIG. 11, a UE UE1 moving in a specific area may transmit a signal (referred to as a traffic status request signal hereinafter) for requesting neighboring UEs UE2 and UE3 to reply with traffic statuses in order to detect surrounding traffic conditions. Traffic conditions are not limited to information indicating the number of vehicles (or traffic information) and may include information about persons and obstacles. A traffic status request and/or a response thereto can be implemented using a discovery signal. It is assumed that the discovery signal can carry a UE ID and a simple message. The simple message may include information about the number and speeds of neighboring vehicles.

Specifically, when UE1 sends a discovery signal for traffic status request while entering a specific area, the neighboring UEs UE2 and UE3 may include surrounding traffic condition information thereof in discovery signals and reply with the discovery signals. In this case, when the size of a message/container for traffic information in a discovery signal is 1 bit, "1" may indicate bad traffic conditions, low vehicle speed (e.g. less than a reference value) or a large number of neighboring vehicles (e.g. exceeding a reference number within a reference distance) and "0" may indicate good traffic conditions, high vehicle speed or absence of neighboring vehicles. When the size of the message/container in the discovery signal is large, more detailed surrounding traffic condition information can be contained in a reply. Particularly, a specific bit field (which does not refer to a specific bitstream and is assumed to be a container or bit field if represented as a combination of sequences or sequence parameters) included in the discovery signal can be implemented for multiple purposes and variously interpreted. For example, n-bit information can be defined as a multi-purpose bit field and used to request traffic status information or information about other surrounding conditions. Purposes of the n-bit information can be automatically set by an application program or preset by a user. Alternatively, after information about the purposes of the n-bit information is exchanged between UEs that are interested in traffic information, the n-bit information may be set according to the information.

Even if only simple information is sent back, the value of the information largely depends on how a UE, which has received the information, processes the information. Accordingly, the value of feedback information may largely depend on how the information is processed even if the information has a small number of bits, and the information processing method depends on an application program algorithm.

For example, the discovery signal can function as information even though special information is not transmitted. That is, when the discovery signal is transmitted and then only response signals thereto are received, it is possible to predict traffic conditions according to distributions of time and areas corresponding to the response signals (i.e. UEs that send the response signals) and to update traffic information (map) of an area of interest according to the traffic condition. As necessary, setting in association with a response signal may be needed. Such setting may depend on the purpose of the discovery signal. For example, since navigation systems are used to acquire traffic information, the navigation system may be set such that a response signal is received in a specific resource region in a specific time period. In this case, response signals received after the specific time period may be meaningless and thus may be discarded. This means that an upper service is connected to physical layer discovery signal transmission and reception and resource allocation operations. That is, a discovery signal sequence, transmission timing, reception or monitoring timing, resource allocation, monitoring resource configuration and UE procedure can be differently set in a physical layer according to services. This can be a criterion to classify services. This scheme can be used independently or in connection with the concept of changing procedures and operations for emergency use and normal use.

If the discovery signal can directly deliver basic information (e.g. position and acceleration information) and additional information can be delivered (shared) through indirect communication via an eNB using an application program, a reception UE can recognize surrounding situations more accurately by using the two types of information.

When the discovery signal includes position information, the reception UE can recognize surrounding situations according to the correct position of the UE corresponding to the discovery signal. If the discovery signal includes motion information (e.g. acceleration information), the discovery signal can be used as data for estimating the speed and directivity of the UE. This information may be processed, summarized and sent back. However, when UEs cannot process information according to capability or situation thereof, it may be advantageous to deliver raw data (e.g. a set of position information per hour) by a requested UE and to process the raw data and recognize surrounding situations by a requesting UE.

If UEs are not aware of cardinal points (i.e. east, west, south and north), a distance between UEs is recognized in real time but a map (map seen from the viewpoint of a specific UE) of neighboring UEs is varied in real time when the positions of the UEs are changed. In this case, when neighboring UEs additionally send position information, positions and directions of the UEs are detected and speeds thereof are calculated and thus surrounding traffic conditions can be detected using the positions, directions and speeds. A response signal including position information can be directly transmitted from a neighboring UE or indirectly transmitted through a network. When a plurality of reception antennas is provided to the vehicle corresponding to the neighboring UE even if the neighboring UE does not explicitly provide the response signal, a reception UE can detect the approximate direction of the neighboring UE that has transmitted the response signal and the distance to the neighboring UE through the antennas.

While such additional information may be delivered using D2D communication, some information can be delivered via the network in order to reduce interference due to D2D communication.

Figure 12:
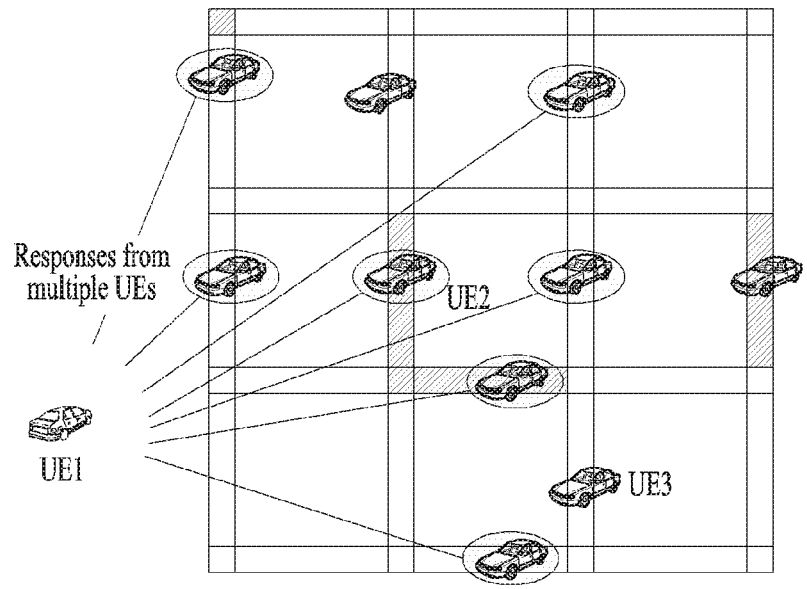
Figure 13:
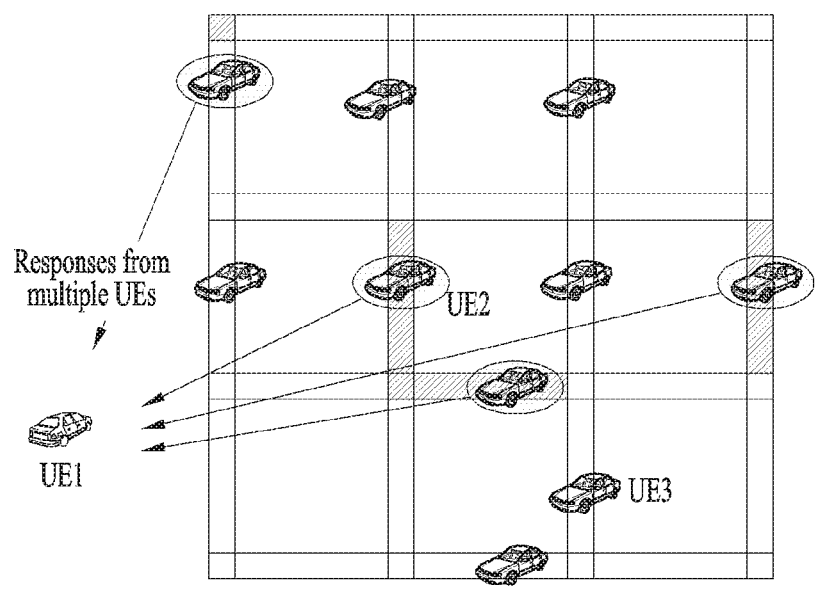

A description will be given of a method for processing a plurality of response signals (e.g. discovery signals from neighboring UEs (e.g. UE2 and UE3)) when the plurality of response signals is received as a response to a traffic information request (e.g. discovery signal from a requesting UE (e.g. UE1)) with reference to FIGS. 12 and 13. FIG. 12 illustrates a case in which all UEs which have received the traffic information request send replies. FIG. 12 is advantageously applicable when discovery signals transmitted as replies from neighboring UEs include additional information. FIG. 13 illustrates a case in which only UEs in specific situations, from among UEs which have received the traffic information request, send discovery signals as replies. FIG. 13 is advantageous when surrounding traffic conditions are recognized through the discovery signals transmitted as replies from the neighboring UEs.

It is assumed that discovery signals are received as responses from a plurality of neighboring UEs while the discovery signals are used as implicit information without including special information, that is, the discovery signals corresponding to response signals do not include traffic related information bits. In this case, the neighboring UEs may be configured to respond to a requesting UE only in the case of problematic situations such as "traffic jam", "presence of vehicles exceeding a reference number" and "under construction" when a discovery signal for requesting traffic condition information is received from the requesting UE. Accordingly, it is possible to recognize surrounding situations from the number of responding UEs. The requesting UE can interpret a large number of neighboring UEs (e.g. larger than a predetermined value) as bad traffic conditions. If positions (e.g. absolute positions or relative positions) of UEs are detected, traffic conditions and accident situations of surrounding alleys can be recognized using the detected positions. When position information is explicitly delivered through the network, real-time traffic conditions can be more accurately recognized.

In addition, the requesting UE can set an area of interest from which the requesting UE wants to acquire traffic status information and include information indicating the area (simply, area information) in traffic status request information. That is, the requesting UE can request only UEs located in the area of interest to reply. UEs can detect the location of the area of interest on the basis of GPS. For example, the area of interest can be specified by GPS information and the radius thereof or specified as an administrative section based on the GPS information. The method according to the present invention can be implemented only using approximate position information detected using discovery signals even when GPS information is not present since the method is effective only with the approximate position information. Accordingly, the location of the area of interest may be recognized as a relative location. For example, the requesting UE can include, in the traffic status request information, the direction (range) and distance (e.g. signal strength and range) of the area of interest on the basis of the current position thereof, and neighboring UEs can recognize whether they are located within the area of interest by tracking directions in which the traffic status request information is received and reception strengths of the traffic status request information using a plurality of reception antennas. In this manner, the neighboring UEs can recognize whether they are included in the area where they need to respond to the requesting UE on the basis of the area information included in the traffic status request information.

A discovery signal may include the purpose (i.e. purpose information) thereof. That is, the purpose information (e.g. information representing that the discovery signal is delivered to accomplish a specific purpose by an application program, service or UE) may be included in the discovery signal such that neighboring UEs correctly understand the purpose of the traffic status request and thus feed back only necessary information, thereby reducing feedback overhead. While more feedback information is delivered, more accurate and necessary information is acquired, the length of the discovery signal increases as the quantity of information included in the discovery signal increases.

Since the discovery signal of the requesting UE can deliver necessary information, UEs that need to respond to the requesting UE can be designated by setting an area, UE ID range or conditions (e.g. speed, acceleration, movement direction, region, etc.). In this case, neighboring UEs can deliver more detailed information about traffic conditions using discovery signals capable of including a large amount of information. For example, a neighboring UE can send a more accurate reply such as "slightly congested" rather than "congested" to the requesting UE such that the requesting UE can acquire more accurate traffic status information. Furthermore, it is possible to acquire information from a specific neighboring UE (group) by delivering the discovery signal to the specific neighboring UE (group) only. If the discovery signal is not delivered to a specific neighboring UE, all neighboring UEs (i.e. all UEs which have received the discovery signal) may need to send replies.

When a plurality of pieces of accurate information is received from a plurality of UEs, how to process the information may depend on an application program. A lower layer may process the information and transfer the processed information to an upper layer. A method of combining information includes majority rule. For example, when K neighboring UEs from among N neighboring UEs located in a specific area send 1-bit responses, if the number of 1 s is greater than the number of Os, it is possible to select information corresponding to 1 as a response. When response information is n bits, a status most frequently sent back, from among statuses corresponding to the n bits, can be selected.

In addition, when UEs located in a specific congested area receive traffic status request information, a plurality of UEs may simultaneously send back responses and thus congestion may occur. To solve this problem, when a certain UE from among the UEs located in the area sends back a response first (within a predetermined time upon reception of the traffic status request information), neighboring UEs may hear the response and then not report statuses thereof since the requesting UE can recognize the situation of the area only using responses from one or more UEs. To this end, discovery signals sent back from neighboring UEs may include identification information of the requesting UE.

Furthermore, neighboring UEs may deliver only information different from information sent back from other neighboring UEs. That is, the neighboring UEs can send back only differentiated information.

Since traffic information is based on two-way communication, information about a direction in which congestion occurs may be very useful. When traffic information depends on discovery signals only, the traffic information may represent that the area corresponding thereto is congested irrespective of the direction thereof. However, when additional information is delivered, it is desirable that direction information be included therein. If traffic information can be derived on the basis of UE mobility, the direction information may not be included in the additional information. Accordingly, whether the direction information is included in the additional information may be preset according to implementation of the method. When only discovery signals are present, it is possible to predict directivity by estimating UE mobility.

The aforementioned method is based on the assumption that traffic status request information is transmitted to neighboring UEs and discovery signals indicating traffic status information are received as responses to the traffic status request information from the neighboring UEs. However, a UE may move while periodically broadcasting a discovery signal indicating traffic status information. That is, a UE that wants to acquire traffic information or a UE that wants to provide traffic information can broadcast a discovery signal including surrounding traffic status information thereof periodically or at (configurable) intervals. Such information can be broadcast mainly for unspecified multiple UEs while the information may be requested by a specific neighboring UE. In this situation, other neighboring UEs may naturally receive a plurality of discovery signals and easily recognize congested roads or alleys using the received discovery signals. When many congestion signals are detected from a specific area, it is possible to determine that the area is congested or to analyze a degree of congestion by processing detailed information according to the degree of congestion and to display the result on the vehicle display in various colors, to thereby provide a surrounding road congestion status.

When the proposed method is used in connection with a path-finding function, information about a specific destination may be interpreted as intention to acquire traffic information about a specific position/area. In this case, it is possible to receive request-based services from UEs located in the corresponding area by delivering information about the purpose of traffic status information acquisition and the destination to the UEs. That is, it is possible to receive traffic information only from UEs in a specific area and to analyze the received traffic information to form a traffic information map.

Alternatively, it is possible to collect traffic information, which is periodically broadcast by UEs located in a specific area, without a request procedure so as to accomplish a traffic information map of the specific area. The latter may be more advantageous in terms of implementation.

While the aforementioned method is implemented using the discovery signal, the method may be implemented using direct communication. When direct communication is used, a large amount of information can be delivered and thus a lot of surrounding information can be transmitted. Particularly, images of surrounding buildings and road conditions can be delivered such that a requesting UE can recognize the surrounding situation by processing the images. A UE which performs real-time relaying may be present.

Figure 14:
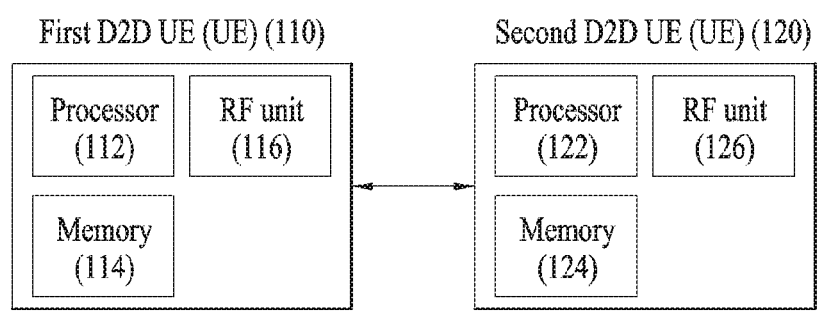
FIG. 14 is a block diagram of a User Equipment (UE) according to an embodiment of the present invention.

FIG. 14 illustrates UEs applicable to embodiments of the present invention.

Referring to FIG. 14, a first D2D UE 110 and a second D2D UE 120 can directly communicate with each other without a network. The first D2D UE 110 includes a processor 112, a memory 114 and a radio frequency (RF) unit 116. The processor 112 may be configured to implement procedures and/or methods proposed by the present invention. The memory 114 is connected to the processor 112 and stores information related to operations of the processor 112. The RF unit 116 is connected to the processor 112 and transmits and/or receives radio signals. The second D2D UE 120 includes a processor 122, a memory 124 and a radio frequency (RF) unit 126. The processor 122 may be configured to implement procedures and/or methods proposed by the present invention. The memory 124 is connected to the processor 122 and stores information related to operations of the processor 122. The RF unit 126 is connected to the processor 122 and transmits and/or receives radio signals. The first D2D UE 110 and/or the second D2D UE 120 may have a single antenna or multiple antennas, and may be carried by a user or installed in the vehicle.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term "BS" may be replaced with the term fixed station, Node B, evolved Node B (eNode B or eNB), Access Point (AP), etc. The term "terminal" may be replaced with the term UE, Mobile Station (MS), Mobile Subscriber Station (MSS), Subscriber Station (SS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a method and apparatus for acquiring/providing traffic information using D2D communication in a wireless communication system.

What is claimed is:

1. A method for acquiring traffic information by a user equipment (UE) in a wireless communication system, the method comprising:
transmitting a first device-to-device (D2D) discovery signal requesting traffic information to a plurality of first neighboring UEs;
receiving, in response to the first D2D discovery signal, one or more second D2D discovery signals including identifications of one or more second neighboring UEs from the one or more second neighboring UEs among the plurality of first neighboring UEs; and
updating traffic information of a surrounding area based on a number of the received one or more second D2D discovery signals,
wherein the one or more second D2D discovery signals are transmitted from the one or more second neighboring UEs, when a number of third neighboring UEs located within a first distance from the one or more second neighboring UEs exceeds a reference number,
wherein no additional second D2D discovery signals are received within a certain time period, after receiving one of the one or more second D2D discovery signals from the one or more second neighboring UEs among the plurality of first neighboring UEs, and
wherein the plurality of first neighboring UEs are located within a second distance from the UE.

2. The method according to claim 1, further comprising receiving additional traffic information about the one or more second neighboring UEs from an eNB,
wherein the traffic information of the surrounding area is updated on a basis of based on the traffic information and the additional traffic information.

3. The method according to claim 1, further comprising overlaying the updated traffic information of the surrounding area on a display of a vehicle navigation system displaying traffic maps.

4. A user equipment (UE) used in a wireless communication system, the UE comprising:
a radio frequency (RF) unit; and
a processor,
wherein the processor is configured to transmit a first device-to-device (D2D) discovery signal requesting traffic information to a plurality of first neighboring UEs, to receive, in response to the first D2D discovery signal, one or more second D2D discovery signals including identifications of one or more second neighboring UEs from the one or more second neighboring UEs among the plurality of first neighboring UEs, and to update traffic information of a surrounding area based on a number of the received one or more second D2D discovery signals,
wherein the one or more second D2D discovery signals are transmitted from the one or more second neighboring UEs, when a number of third neighboring UEs located within a first distance from the one or more second neighboring UEs exceeds a reference number,
wherein no additional second D2D discovery signals are received within a certain time period, after receiving one of the one or more second D2D discovery signals from the one or more second neighboring UEs among the plurality of first neighboring UEs, and
wherein the plurality of first neighboring UEs are located within a second distance from the UE.

5. The UE according to claim 4, wherein the processor is configured to receive additional traffic information about the one or more second neighboring UEs from an eNB,
wherein the traffic information of the surrounding area is updated on a basis of based on the traffic information and the additional traffic information.

6. The UE according to claim 4, wherein the processor is configured to overlay the updated traffic information of the surrounding area on a display of a vehicle navigation system displaying traffic maps.

* * * * *